United States Patent

Uremovic

Patent Number: 5,952,609
Date of Patent: Sep. 14, 1999

[54] SUPPORT POINT FOR AN OVERHEAD CONDUCTOR

[75] Inventor: Nikola Uremovic, Erlangen, Germany

[73] Assignee: Siemens AG, Germany

[21] Appl. No.: 08/894,758

[22] PCT Filed: Feb. 26, 1996

[86] PCT No.: PCT/DE96/00318

§ 371 Date: Dec. 18, 1997

§ 102(e) Date: Dec. 18, 1997

[87] PCT Pub. No.: WO96/27511

PCT Pub. Date: Sep. 12, 1996

[30] Foreign Application Priority Data

Mar. 8, 1995 [DE] Germany ............................. 19508237

[51] Int. Cl.[6] .................................................. H02G 7/14
[52] U.S. Cl. .............................. 174/42; 191/39; 248/61
[58] Field of Search ................................ 174/40 R, 41, 174/42, 43, 44, 45 R, 45 TD; 191/33 R, 39, 40, 41, 42, 43; 248/61, 58, 63

[56] References Cited

U.S. PATENT DOCUMENTS

| 966,102 | 8/1910 | Kempton | 191/41 |
|---|---|---|---|
| 3,644,660 | 2/1972 | Dulhunty | 174/42 |
| 3,941,914 | 3/1976 | Oishi et al. | 174/42 |
| 4,018,315 | 4/1977 | Proud | 191/39 |
| 4,350,851 | 9/1982 | Seddon | 191/39 |
| 4,625,839 | 12/1986 | Cockburn et al. | 191/40 |
| 4,679,672 | 7/1987 | Seddon et al. | 191/41 |
| 4,825,987 | 5/1989 | Seddon | 191/39 |

FOREIGN PATENT DOCUMENTS

| 4482893 | 4/1994 | Australia | 174/40 R |
|---|---|---|---|
| 0 111 730 | 6/1984 | European Pat. Off. | |
| 1 615 538 | 7/1970 | Germany . | |
| 30 42 855 | 5/1981 | Germany . | |
| 63-297132 | 12/1988 | Japan . | |
| 2068081 | 8/1981 | United Kingdom | 174/42 |

Primary Examiner—Dean A. Reichard
Assistant Examiner—Dhiro R Patel
Attorney, Agent, or Firm—Kenyon & Kenyon

[57] ABSTRACT

An overhead traction wire support which including a first plate and a second plate, the first plate having on at least one side at least one leg which can be fastened to a ceiling or a wall of a structure. A second plate, which is made of an electrically conducting material, is held at a distance from the first plate via at least one insulator. A current conductor, along which a current collector can slide, is fastened in an electrically conducting fashion to the second plate on the side which faces away from the first plate, and at least one current amplification line is arranged on the second plate parallel to the current conductor.

18 Claims, 3 Drawing Sheets

SUPPORT POINT FOR AN OVERHEAD CONDUCTOR

BACKGROUND OF THE INVENTION

The invention relates to an overhead traction wire support.

SUMMARY OF THE INVENTION

It is the object of the present invention to provide an overhead traction wire support which is of structurally simple design. This object is met with an overhead traction wire support comprising a first plate about which there is arranged, on at least one side, at least one leg which can be fastened to a ceiling or a wall of a structure. Furthermore, the overhead traction wire support comprises a second plate, which is produced from an electrically conducting material. The second plate is held at a distance from the first plate via at least one insulator. A current conductor along which a current collector can slide is fastened in an electrically conducting fashion to the second plate on the side which faces away from the first plate. Furthermore, at least one current amplification line is arranged on the second plate parallel to the current conductor.

The arrangement of at least one current amplification line on the second plate, which is produced from an electrically conducting material, produces a mechanically simple electrical coupling of the current conductor to the one or more current amplification lines. The overhead traction wire support according to the invention is thus suitable not only for AC voltage supply but also for DC voltage supply having a high power requirement, and can thus be tuned individually to the respective application.

The overhead traction wire support according to the invention, which is equally well suited both for busbars and for contact wires of all types (e.g., grooved contact wires), has a simple design.

By using insulators in the overhead traction wire support to space the first and second plates apart from one another, there is a further improved flow of current to the current conductor from the current amplification lines via the second plate.

An overhead traction wire support in which the first plate is of greater width and/or length than the second plate affords an increased electrical voltage endurance in the case of a horizontal installation—in which case both the first plate and the second plate extend horizontally—since the edges of the first plate which are situated further to the outside radially, can thereby act as rain-breaking edges. This prevents moisture from being deposited on the second plate.

An overhead traction wire in which legs are provided on the parallel sides of the first plate affords further improved stability, and thus an improved level of vibration response of the current conductor by comparison with the current collector.

The legs by means of which the overhead traction wire support can be fastened to the ceiling or to the wall of a structure, can either be joined in one piece to the first plate, or be constructed as separate parts.

An overhead traction wire support in which the legs have different lengths and/or can be supported at differing angles with respect to the first plate is particularly well suited for fastening to walls which extend with a slope, and for horizontal current collection or for fastening to walls which extend vertically or virtually vertically in the case of lateral current collection.

An overhead traction wire support with length adjustable legs, which can include plate structure for varying the angle of mounting with respect to a wall, is equally well suited both for walls which extend at a slope or with a camber, and ceilings. Using such an overhead traction wire support, it is possible for the position of the current conductor during installation to be matched in a simple way to any track elevations which occur.

In yet another embodiment, at least one damping element may be provided between an insulator and first plate and/or between the insulator and the second plate (this can be parallel to the insulator). The advantage of such an embodiment is that vibrations occurring when the track is traveled over, which are transmitted via the current collector to the current conductor, are damped in the overhead traction wire support, with the result that no dangerous vibrations are transmitted to the wall or to the ceiling of the structure.

DETAILED DESCRIPTION

Figure 1:
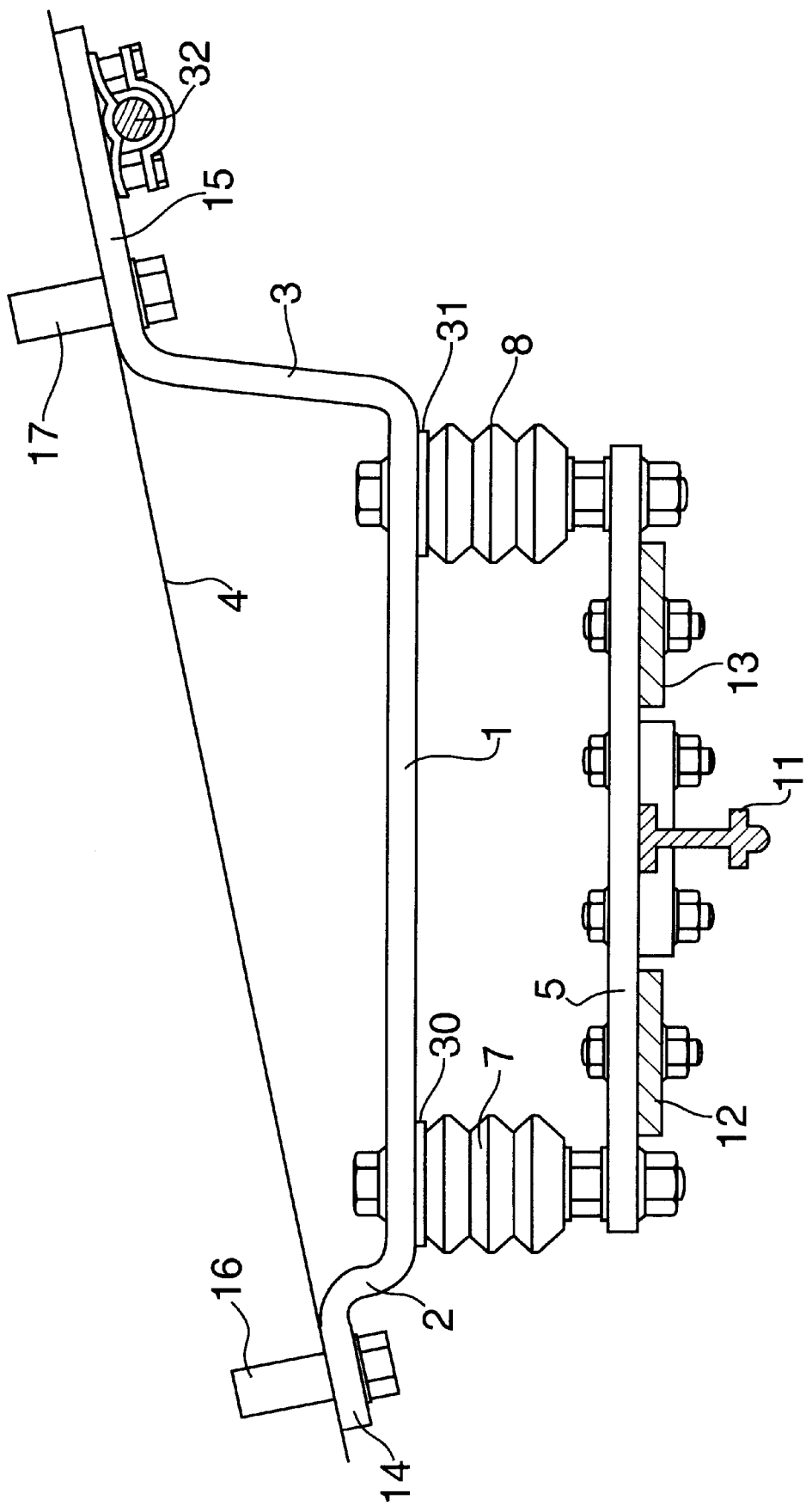
FIG. 1 is an end view of an embodiment of an overhead traction wire support constructed according to the principles of the invention.
Figure 2:
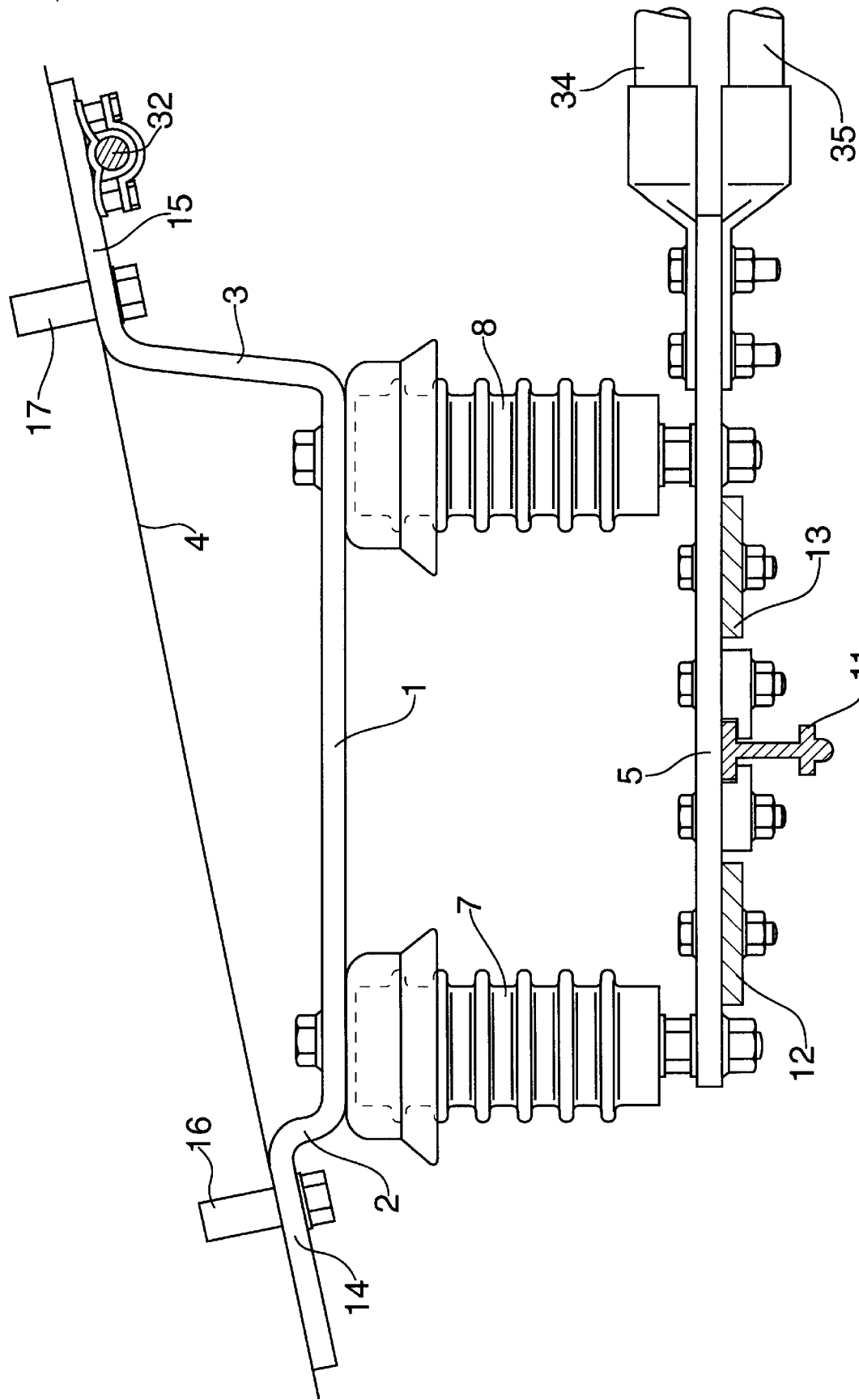
FIG. 2 is an end view, partially in section, of a second embodiment of an overhead traction wire support constructed according to the principles of the invention.

In FIGS. 1 and 2 the first plate is designated by 1 in each case. A leg 2 and 3, respectively, is arranged in each case on two parallel sides of the first plate 1. The two legs 2 and 3 are fastened with their free ends to an inclined ceiling 4 of a structure.

Figure 3:
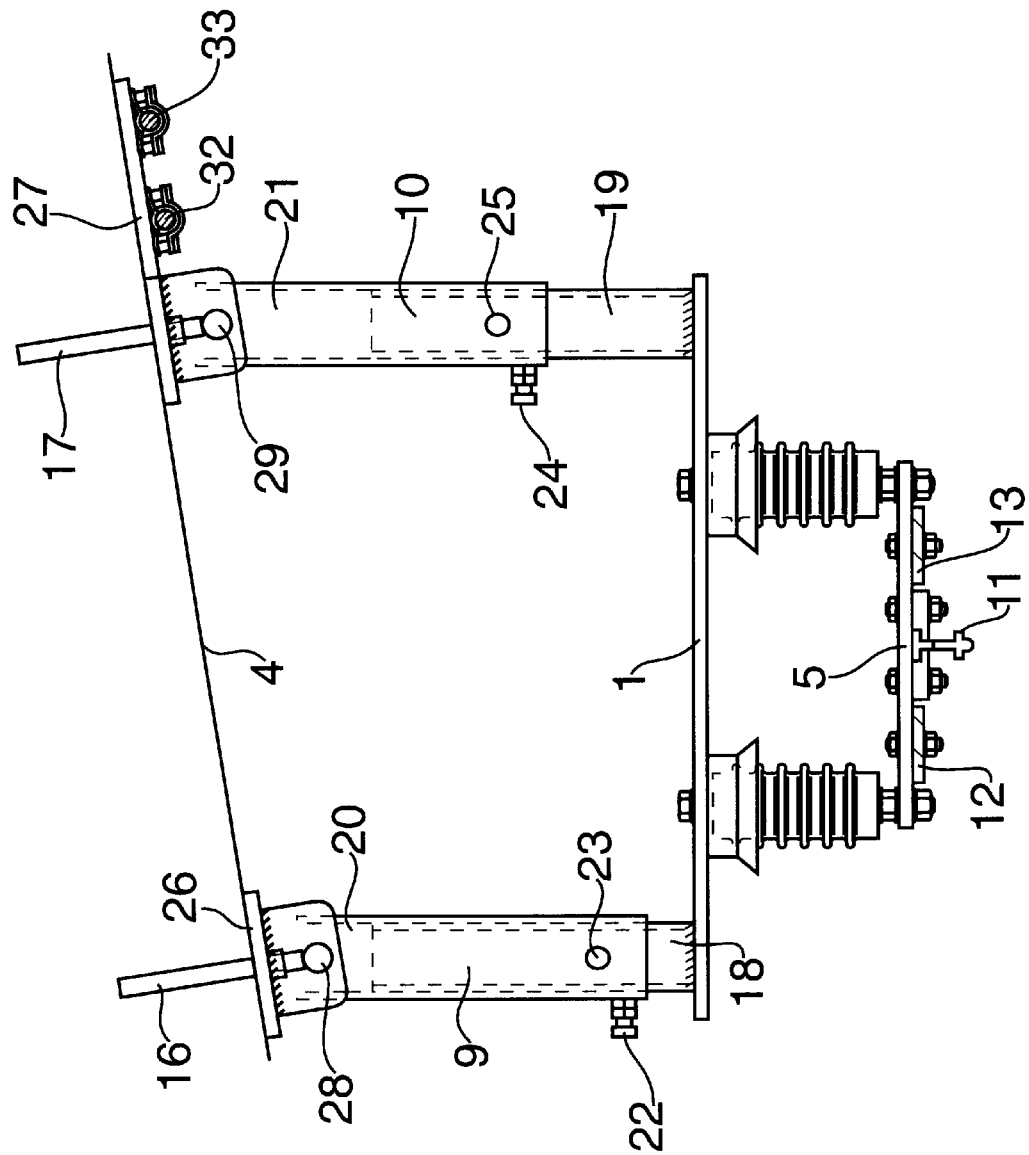
FIG. 3 is an end view, partially in section, of a third embodiment of an overhead traction wire support constructed according to the principles of the invention.

The exemplary embodiment of an overhead traction wire support shown in FIG. 3 likewise comprises a first plate 1 which in each case has a leg 9 or 10, respectively, on its two parallel sides. The two legs 9 and 10 can be adjusted in length, and are likewise fastened with their free ends to an inclined ceiling 4 of a structure.

A second plate 5 is held at a distance from the first plate 1 via in each case two insulators 7 and 8. According to the invention, the second plate 5 is produced from an electrically conducting material, for example copper. A current conductor 11, along which a current collector can slide, is fastened in an electrically conducting fashion to the second plate 5 on the side facing away from the first plate 1. Power supply cable with leads 34, 35 is fastened in an electrically conducting manner to second plate 5 (see FIG. 2). A ground connection 32, 33 is provided for first plate 1 or one of the legs.

The embodiments of the overhead traction wire support according to the invention which are represented in FIGS. 1 to 3 have an increased voltage endurance, since the first plate 1 is in each case longer and wider than the second plate 5. As a result, the edges of the first plate 1 situated further outside radially act as rain-breaking edges, the result being as far as possible to prevent moisture from being deposited on the second plate 5.

In the exemplary embodiments in accordance with FIGS. 1 to 3, current amplification lines 12 and 13, which are constructed as a flat copper strip, are arranged on the second plate 5 parallel to the current conductor 11. In these embodiments, the high current requirement of the current conductor 11 which is necessary in the case of DC voltage supply is ensured in a simple way, since there is a good flow of current from the power supply lines 12 and 13 to the current conductor 11 situated therebetween via the second plate 5.

In the overhead traction wire supports in accordance with FIGS. 1 and 2, the two legs 2 and 3 are connected in one piece to the first plate 1 and differ in length from the first plate 1. In each case, the free ends of the two legs 2 and 3 have a terminating bow 14 and 15, respectively, with at least one through bores in each case. At least one fastening pin 16 and 17, respectively, is inserted in each case into the through bores of each terminating bow 14 and 15, respectively, and is screwed into the ceiling 4 of the structure in a known way.

The legs 9 and 10 of the overhead traction wire support in accordance with FIG. 3 can be adjusted in length. For this purpose, the two legs 9 and 10 comprise a first tube 18 or 19, respectively, which is in each case fastened perpendicularly to the first plate 1. A second tube 20 or 21, respectively, can be mounted in each case onto the free ends of the first tubes 18 and 19, and can be fixed at their mounting length by means of screws 22 to 25.

A holding plate 26 or 27, respectively, is fastened in each case to the ends, facing the ceiling 4, of the second tubes 20 and 21. The inclination of the holding plate 26 or 27, respectively, with respect to the second tube 20 or 21, respectively, can be set in each case about an axis 28 or 29, respectively.

The overhead traction wire support according to FIG. 3 can be aligned in the desired position in a simple way by means of the slope-adjustable holding plates 26 and 27 as well as by the second tubes 20 and 21.

The holding plates 26 and 27 likewise have through bores into which it is possible to insert the fastening pins 16 and 17 which are screwed into the ceiling 4 of the structure in a known way.

In order to reduce the transmission of vibrations onto the structure, a damping element 30 is arranged between the first plate 1 and the insulator 7, and a damping element 31 is arranged between the first plate 1 and the insulator 8 in the case of the exemplary embodiment in accordance with FIG. 1.

What is claimed is:

1. An overhead traction wire support comprising:
    a first plate having parallel extending sides, at least one of which sides has at least one leg which can be fastened to a ceiling or to a wall of a structure;
    a second plate, made from an electrically conducting material, which is held at a distance from the first plate via at least one insulator;
    a current conductor, said current conductor being fastened in an electrically conducting fashion to the second plate on a side of the second plate which faces away from the first plate; and
    at least one current amplification line on the second plate, said at least one current amplification line extending along the second plate parallel to the current conductor.

2. An overhead traction wire support as set forth in claim 1, wherein said at least one current amplification line is a flat copper strip.

3. An overhead traction wire support as set forth in claim 1, wherein the second plate is held at a distance from the first plate via two insulators.

4. An overhead traction wire support as set forth in claim 1, wherein the first plate has a greater extent than the second plate.

5. An overhead traction wire support as set forth in claim 1, wherein the at least one leg is a flat iron part.

6. An overhead traction wire support as set forth in claim 1, wherein the at least one leg is joined in one piece to the first plate.

7. An overhead traction wire support as set forth in claim 1, further comprising a power supply cable that is fastened in an electrically conducting fashion to the second plate.

8. An overhead traction wire support as set forth in claim 1, wherein one of the first plate and said one of the legs has a ground connection.

9. An overhead traction wire support as set forth in claim 1, further comprising at least one damping element arranged between the insulator and the first plate.

10. An overhead traction wire support as set forth in claim 1, further comprising at least one damping element arranged between the insulator and the second plate.

11. An overhead traction wire support as set forth in claim 1, further comprising at least one damping element parallel to the insulator.

12. An overhead traction wire support as set forth in claim 1, wherein a leg is arranged in each of the two parallel sides of the first plate.

13. An overhead traction wire support as set forth in claim 12, wherein the legs differ in length.

14. An overhead traction wire support as set forth in claim 12, wherein the legs differ in their angular orientation with respect to the first plate.

15. An overhead traction wire support as set forth in claim 14, wherein the legs include hardware at their free ends by which the angle between the first plate and the surface to which the legs are attached can be adjusted.

16. An overhead traction wire support as set forth in claim 12, wherein the legs can be adjusted in length.

17. An overhead traction wire support as set forth in claim 1, wherein the leg is constructed as a separate part.

18. An overhead traction wire support as set forth in claim 17, wherein the legs are screwed onto the first plate.

* * * * *